United States Patent
Liebl et al.

(10) Patent No.: US 10,280,775 B2
(45) Date of Patent: May 7, 2019

(54) GUIDE VANE RING FOR A TURBOMACHINE

(71) Applicant: MTU Aero Engines AG, Munich (DE)

(72) Inventors: Christian Liebl, Bockhorn (DE); Richard Scharl, Karlsfeld (DE); Daniel Kirchner, Munich (DE); Alexander Buck, Munich (DE); Thomas Hess, Munich (DE)

(73) Assignee: MTU Aero Engines AG, Munich (DE)

( * ) Notice: Subject to any disclaimer, the term of this patent is extended or adjusted under 35 U.S.C. 154(b) by 643 days.

(21) Appl. No.: 15/006,356

(22) Filed: Jan. 26, 2016

(65) Prior Publication Data

US 2016/0222807 A1 Aug. 4, 2016

(30) Foreign Application Priority Data

Feb. 2, 2015 (DE) .......................... 10 2015 201 782

(51) Int. Cl.
*F01D 9/04* (2006.01)
*F01D 11/00* (2006.01)
(Continued)

(52) U.S. Cl.
CPC ............ *F01D 9/047* (2013.01); *B22F 3/1055* (2013.01); *B22F 5/04* (2013.01); *B23K 26/342* (2015.10);
(Continued)

(58) Field of Classification Search
None
See application file for complete search history.

(56) References Cited

U.S. PATENT DOCUMENTS 6,910,854 B2 * 6/2005 Joslin ...................... F01D 5/225
                                                                                 415/139
7,316,402 B2 * 1/2008 Paauwe ................ F01D 11/005
                                                                                 277/641

(Continued)

FOREIGN PATENT DOCUMENTS

CH           698036 B1    11/2011
DE           6601211 U     2/1969
(Continued)

OTHER PUBLICATIONS

"More Efficient Jet Engines Produced by Additive Manufacturing", www.http://www.lasersystemseurope.com/news/story/more-efficient-jet-engines-produced-additive-manufacturing; LaserSystems Europe, May 30, 2014.

*Primary Examiner* — Woody A Lee, Jr.
*Assistant Examiner* — Jason A Fountain
(74) *Attorney, Agent, or Firm* — Barlow, Josephs & Holmes, Ltd.

(57) ABSTRACT

The invention relates to a guide vane ring with at least one guide vane ring segment for a turbomachine, including a plurality of guide vanes arranged radially around an axis of rotation, an outer shroud arranged radially on the outer side of the guide vanes, and an inner shroud arranged radially on the inner side of the guide vanes, wherein the outer shroud or the inner shroud has at least one expansion joint, wherein the guide vane ring segment is formed in one piece with the guide vanes, the outer shroud, and the inner shroud and the at least one expansion joint is sealed in each case by at least one sealing device arranged in the respective expansion joint.

16 Claims, 1 Drawing Sheet

(51) Int. Cl.
    *B23K 26/342*    (2014.01)
    *B22F 3/105*     (2006.01)
    *B22F 5/04*      (2006.01)
    *F01D 25/00*     (2006.01)
    *B33Y 10/00*     (2015.01)
    *B33Y 80/00*     (2015.01)

(52) U.S. Cl.
    CPC .............. *F01D 9/04* (2013.01); *F01D 11/005* (2013.01); *F01D 25/005* (2013.01); *B33Y 10/00* (2014.12); *B33Y 80/00* (2014.12); *F05D 2230/31* (2013.01); *F05D 2240/55* (2013.01); *F05D 2260/941* (2013.01)

(56) References Cited

U.S. PATENT DOCUMENTS

| | | | | |
|---|---|---|---|---|
| 7,901,186 B2* | 3/2011 | Cornett | ................ | F01D 11/005 277/643 |
| 8,684,673 B2* | 4/2014 | Salazar | ................ | F01D 11/005 277/644 |
| 9,534,500 B2* | 1/2017 | Bouchard | ................ | F01D 9/04 |
| 9,617,865 B2* | 4/2017 | Zotz | ........................ | F01D 17/16 |
| 9,784,131 B2* | 10/2017 | Feldmann | ................ | F01D 9/02 |
| 2004/0067131 A1* | 4/2004 | Joslin | ...................... | F01D 5/225 415/139 |
| 2007/0210536 A1* | 9/2007 | Paauwe | ................ | F01D 11/005 277/644 |
| 2009/0053055 A1* | 2/2009 | Cornett | ................ | F01D 11/005 415/208.2 |
| 2012/0274034 A1* | 11/2012 | Bouchard | ................ | F01D 9/04 277/650 |
| 2014/0003918 A1* | 1/2014 | Salazar | ................ | F01D 11/005 415/173.6 |
| 2014/0294567 A1* | 10/2014 | Zotz | ........................ | F01D 17/16 415/115 |
| 2015/0003970 A1* | 1/2015 | Feldmann | ................ | F01D 9/02 415/173.1 |

FOREIGN PATENT DOCUMENTS

| | | |
|---|---|---|
| DE | 102004037955 A1 | 3/2006 |
| DE | 102009013819 A1 | 9/2010 |
| EP | 1130219 A1 | 9/2001 |
| EP | 1408199 A1 | 4/2004 |
| EP | 1510654 A1 | 3/2005 |
| EP | 2666969 A1 | 11/2013 |
| WO | 2013029584 A1 | 3/2013 |
| WO | 2013110792 A1 | 8/2013 |
| WO | 2014090907 A1 | 6/2014 |

* cited by examiner

GUIDE VANE RING FOR A TURBOMACHINE

BACKGROUND OF THE INVENTION

The invention relates to a guide vane ring for a turbomachine. The invention further relates to a gas turbine with such a guide vane ring and to a method for the manufacture of such a guide vane ring.

Known from DE 10 2009 013 819 A1 is a guide vane ring for a turbomachine. This guide vane ring comprises a plurality of guide vanes arranged radially around an axis of rotation, by means of which a flow of gas can be diverted into a turbomachine. The guide vane ring comprises an outer shroud arranged radially on the outer side of the guide vanes and an inner shroud arranged radially on the inner side of the guide vanes. In this case, the guide vane ring is composed of a plurality of individual guide vane ring segments, which are welded together by means of a thermal joining method.

A drawback is that, for especially large dimensions and/or high operating temperatures of the turbomachine, such a guide vane ring cannot withstand the resulting thermal loads without anything further. A possible remedy is either to divide the inner shroud or the outer shroud, so that the outer shroud or the inner shroud has a plurality of expansion joints spaced apart from one another along the peripheral direction. However, a drawback of such expansion joints is that the guide vane ring thereby has leakage. The flow of gas can therefore escape at least partially from the guide vane ring and, in some cases, also thus from the turbomachine. As a result, the efficiency of the guide vane ring and hence also the efficiency of the turbomachine decreases.

Known from DE 6601221 U is a guide vane ring having at least two guide vane ring segments for a turbomachine comprising a plurality of guide vanes arranged radially around an axis of rotation, an outer shroud arranged radially on the outer side of the guide vanes, and an inner shroud arranged radially on the inner side of the guide vanes. The inner shroud has a plurality of expansion joints spaced apart from one another along the peripheral direction. However, these expansion joints do not pass through the entire inner shroud in the peripheral direction, so that high loads can continue to act on the inner shroud.

SUMMARY OF THE INVENTION

The object of the present invention is to create a guide vane ring, a gas turbine, and a method for the manufacture of a guide vane ring, as a result of which a turbomachine or a gas turbine is especially efficient.

This object is achieved in accordance with the guide vane ring of the present invention. Furthermore, this object is achieved by a gas turbine and a method for the additive manufacture of a guide vane ring according to the present invention. Advantageous embodiments with appropriate enhancements of the invention are discussed in detail below, with advantageous embodiments of the guide vane ring to be regarded as advantageous embodiments of the method and of the turbine and vice versa.

A first aspect of the invention relates to a guide vane ring for a turbomachine with at least one guide vane ring segment comprising at least one guide vane arranged radially around an axis of rotation, an outer shroud arranged radially on the outer side of the guide vane, and an inner shroud arranged radially on the inner side of the guide vane, with the outer shroud or the inner shroud having at least one expansion joint. In addition, the guide vane ring segment with the guide vane, the outer shroud, and the inner shroud are formed in one piece, with the at least one expansion joint being sealed by means of at least one sealing device arranged in the expansion joint. A one-piece guide vane ring segment may also be referred to as an integral guide vane ring segment. The sealing device in the expansion joint brings about an especially high efficiency of the guide vane ring, because, as a result thereof, no leakage or at least only a particularly reduced leakage will occur at the expansion joint or expansion joints of the guide vane ring segments. As a result, an integral guide vane ring segment can also be employed for especially large turbomachines and/or turbomachines with especially high operating temperatures, without the efficiency of the guide vane ring being reduced on account of the expansion joints that are then necessary.

In another advantageous embodiment of the invention, it is provided that the guide vane ring segment is manufactured by means of an additive manufacturing method. Owing to the fact that the guide vane ring segment is manufactured by means of an additive manufacturing method in one piece with the at least one guide vane, the outer shroud, and the inner shroud, the guide vane ring can be manufactured in an especially cost-effective manner. An additive manufacturing method is a primary forming method in which components are produced layer by layer. Examples of additive manufacturing methods are laser sintering or laser melting and so-called 3D printing. In these methods, a starting material, which is present in powder form or liquid form, for example, is fused layer by layer to create a finished component by melting with a high-energy beam, such as, for example, a laser beam or an electron beam. No additional fabrication steps for introducing the expansion joints are required. The individual guide vane ring segments can be bolted or welded together, for example, in order to join them.

It is further advantageous when the guide vane ring is composed of a single guide vane ring segment running 360° around the axis of rotation. Such a guide vane ring is also referred to as an integral guide vane ring. In an advantageous manner, no additional fabrication steps are necessary for joining the individual guide vane ring segments to one another. In particular, the additive fabrication of such a complete guide vane ring is especially cost-effective.

Alternatively, the guide vane ring can be formed from two guide vane ring segments, for example. The turbomachine is then especially easy to mount and, in particular, it can be mounted radially. A small number of guide vane ring segments means an especially low assembly effort and an especially low potential leakage at the joining sites between the guide vane ring segments.

In another advantageous embodiment of the guide vane ring according to the invention, it is provided that the sealing device is manufactured in one piece with the outer shroud or the inner shroud. In this way, the manufacture of the guide vane ring is especially cost-effective. Moreover, the guide vane ring can be fabricated especially rapidly in an additive manufacturing method in this way. No additional fabrication step is necessary for the manufacture of the sealing device. Moreover, in this way, the sealing device can be integrated directly in the guide vane ring or the associated outer shroud or inner shroud. In this way, it is possible to create sealing devices that cannot be manufactured by conventional fabrication methods, such as, for example, the formation of the guide vane ring segment by segment followed by thermal joining of the guide vane ring segments. For example, it is also possible to provide sealing devices that cannot subsequently be attached to or inserted into a guide vane ring manufactured in one piece. In particular, it is possible to create sealing devices that seal each of the expansion joints especially well. In this case, the sealing device can be manufactured in one piece with the guide vane ring segment, namely, the at least one guide vane, the outer shroud, and the inner shroud. In this way, an integral guide vane ring can be manufactured in an especially cost-effective manner.

In another advantageous embodiment of the guide vane ring according to the invention, it is provided that the inner shroud has the expansion joints. In many turbomachines, the inner shroud is exposed to the highest thermal load and, as a result, also experiences the largest thermal expansion. For this reason, a positioning of the expansion joints on the inner shroud is especially appropriate. The outer shroud can then be utilized in an advantageous manner with its larger surface for bearing the guide vane ring. Alternatively, it can be provided that the outer shroud has the expansion joints. This is particularly advantageous when the outer shroud is subjected to the highest thermal load. This can be the case, for example, when the inner shroud is actively cooled.

It is especially advantageous for the guide vane ring according to the invention when the sealing device and the outer shroud and/or the inner shroud are formed from the same material. Preferably, in this case, at least the shroud that has the expansion joints and in which the sealing device is arranged is formed from the same material as the sealing device. In this case, the corresponding shroud and the sealing device can be manufactured jointly in an additive manufacturing method in an especially cost-effective manner. Moreover, it is possible in this way to create an especially robust connection between the corresponding shroud and the sealing device. In addition, components formed from the same material also exhibit the same properties under thermal load, in particular an identical thermal expansion coefficient. Additional loads of the guide vane ring due to different material behavior under loads caused by operation can thus be prevented.

All components of the guide vane ring according to the invention can advantageously be formed from a single material. An especially durable material, which is suitable for this purpose, is a nickel-based alloy, for example. An additive manufacturing method using a single material is especially cost-effective. Preferably, for this reason, the entire guide vane ring is formed from the same material. Alternatively, the different components of the guide vane ring can also be formed from different materials. The advantage offered in this case is that the guide vane ring can be constructed in an especially appropriate manner with respect to load and/or can be easily constructed.

In another advantageous embodiment of the invention, it is provided that the sealing device comprises a sealing element that is mounted loosely in a receiving region of the expansion joint. A sealing device formed in this way can be fabricated in an especially cost-effective and simple manner. The sealing device can be designed as a plate, for example, which is mounted loosely in a corresponding receiving region. In this case, joints can also be provided in the receiving region, by means of which it is possible to prevent any mechanical load on the sealing device due to thermal expansion. In this case, the sealing device can also comprise a spring element, which imparts a force on the sealing element to effect sealing. In particular, when an additive fabrication method is used for the manufacture of the guide vane ring segment, the sealing device does no longer needs to be mounted subsequently.

In another advantageous embodiment of the guide vane ring, it is provided that the sealing device is designed as a labyrinth seal in one piece with the outer shroud or inner shroud having the expansion joints. A labyrinth seal seals the expansion joint especially well and, in addition, is especially robust. In addition, the guide vane ring can be manufactured in this way in an especially cost-effective manner, since the sealing device can be fabricated in one piece directly with the corresponding shroud. Especially in the case of an additive fabrication method, respective pin elements that form the labyrinth seal, for example, can thus be fabricated for the expansion joint directly in one piece on the edge region of the shroud at the same time.

In another advantageous embodiment of the guide vane ring, it is provided that the sealing device has an elastically and/or plastically deformable sealing element, which is formed in one piece with the outer shroud or inner shroud having the expansion joints. The advantages of a one-piece fabrication of the sealing element with the corresponding shroud also apply in this embodiment. As a result of the plastic and/or elastic deformability of the sealing element, the sealing element can especially well withstand loads due to a deformation, in particular a thermal deformation, of the outer shroud or inner shroud. At the same time, the sealing devices that are designed in this way seal the guide vane ring especially well. For example, it is possible in this way for the sealing device to join the two radially running, oppositely-lying sides of the expansion joint to one another in a closed manner. In this case, the expansion joint can therefore be completely sealed by the sealing device.

In this case, it is especially advantageous when the elastically and/or plastically deformable sealing element is designed as a spring-like, corrugated, S-shaped, and/or meandering element. The sealing element designed in this way is especially durable toward external loads, in particular those caused by expansions of the shroud. Moreover, the sealing element designed in this way can be manufactured in an especially cost-effective manner.

In other advantageous embodiments of the guide vane ring according to the invention, it is provided that, in the region of the mutually adjacent sides of the outer shroud and/or inner shroud of at least two guide vane ring segments, an expansion joint is formed, in which at least one sealing device is provided. For example, this can be a labyrinth seal, the elements of which are formed in the respective mutually adjacent end regions of the two guide vane ring segments, which then form the labyrinth seal when the guide vane ring segments are joined together. Furthermore, it is possible for the expansion joint to be formed entirely in one of the mutually adjacent lateral regions of the outer shroud and/or inner shroud or that the expansion joint is formed in portions by correspondingly mutually adjacent recesses in the mutually adjacent lateral regions of the outer shroud and/or inner shroud. In these embodiments of the invention, any leakage in the joining regions between guide vane ring segments can also be prevented or at least reduced. At the same time, it is also possible to provide an expansion joint between the guide vane ring segments in order to reduce overall any loads on the guide vane ring.

A second aspect of the invention relates to a gas turbine, in particular an aircraft engine. Both a gas turbine and an aircraft engine are turbomachines, which must meet especially stringent requirements. In particular, especially high thermal loads occur. At the same time, a gas turbine, in particular an aircraft engine, must operate especially efficiently. For this reason, it is especially advantageous to employ the guide vane ring according to the invention in a gas turbine, in particular an aircraft engine. Further features of the second aspect of the invention and the advantages thereof may be taken from the description of the first aspect of the invention, with advantages embodiments of the first aspect of the invention to be regarded as advantageous embodiments of the second aspect of the invention and vice versa.

A third aspect of the invention relates to a method for the additive manufacture of a guide vane ring for a turbomachine with at least one guide vane ring segment comprising at least one guide vane arranged radially around an axis of rotation, an outer shroud arranged radially on the outer side of the guide vane, and an inner shroud arranged radially on the inner side of the guide vane, with the outer shroud or the inner shroud having at least one expansion joint. In this case, the method comprises at least the following steps:

local melting of a powder layer or a liquid layer by means of a high-energy beam that is produced by a radiation source and diverted by a diverting device for local fusion and/or sintering of the powder layer or the liquid layer to form a first component layer;

deposition and local melting of further powder layers or liquid layers on the first component layer for local generation of further component layers on the first component layer;

repetition of the deposition and local melting of the powder layer or liquid layer for one-piece manufacture of the guide vanes, the outer shroud, the inner shroud, and, in each case, at least one sealing device arranged in the at least one expansion joint, by means of which this expansion joint is sealed.

It is possible by means of the method according to the invention for the additive manufacture of a guide vane ring to produce the guide vane ring according to the first aspect of the invention in an especially cost-effective manner. The guide vane ring according to the invention can be manufactured as an integral guide vane ring in one piece in a single manufacturing step. This means that all components of the guide vane ring are fabricated directly in a single process step in a cost-effective and rapid manner. In particular, the additive method can be an additive manufacturing method such as selective laser sintering or selective laser melting.

Further features and the advantages thereof may be taken from the descriptions of the first and second aspects of the invention, with advantageous embodiments of the first and second aspects of the invention to be regarded as advantageous embodiments of the third aspect of the invention and vice versa.

BRIEF DESCRIPTION OF THE DRAWING FIGURES

Further features of the invention ensue from the claims and the exemplary embodiments as well as on the basis of the drawings. The features and the combinations of features mentioned above in the description as well as the features and combinations of features mentioned below in the exemplary embodiment can be used not only in the respectively given combination, but also in other combinations, without departing from the scope of the invention.

Shown are:

DESCRIPTION OF THE INVENTION

Figure 1:
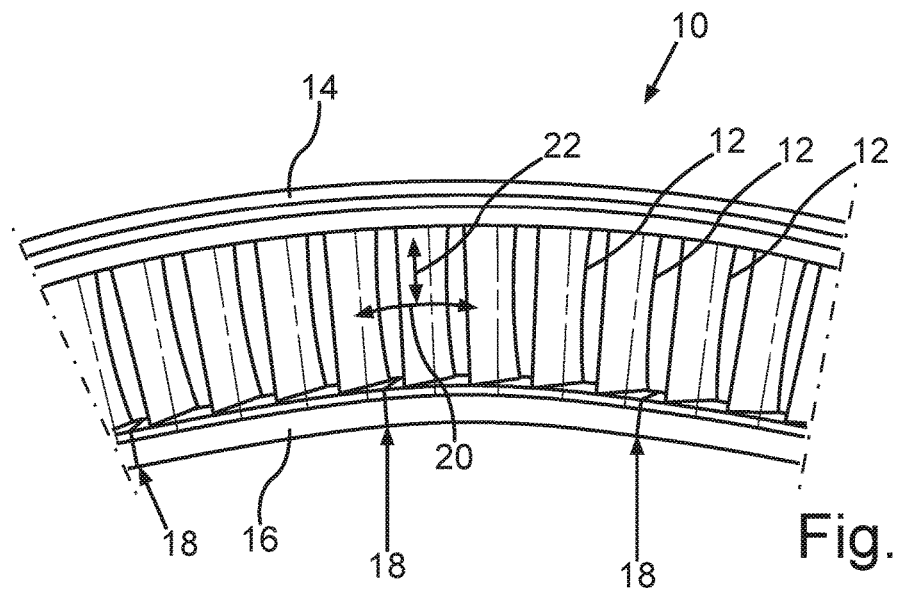
FIG. 1 is an excerpted schematic view of a guide vane ring for a turbomachine.

FIG. 1 shows, in an excerpted schematic view, a guide vane ring 10 for a turbomachine. The turbomachine can be a gas turbine, for example, in particular an aircraft engine. This guide vane ring 10 comprises a plurality of guide vanes 12 arranged radially around an axis of rotation. The radial direction is marked by arrow 22. By means of these guide vanes 12, a flow of gas, which flows through the turbomachine, can be influenced. In particular, the flow of gas can be diverted by means of the guide vane ring 10 and/or vortexes in the flow of gas can be reduced. In this way, the efficiency of the turbomachine is increased. The guide vane ring 10 can be arranged, for example, in front of or in back of a rotor blade ring of a turbine or a compressor of the turbomachine.

In the exemplary embodiment shown in FIG. 1, the guide vane ring 10 comprises only a single guide vane ring segment running 360° around the axis of rotation. In this way, no leakage between different guide vane ring segments can ensue. Moreover, such an integral guide vane ring 10 is especially robust. Alternatively, the guide vane ring 10 can also comprise a plurality, in particular two, guide vane ring segments. The guide vane ring 10 is then especially easy to mount. In this case, the guide vane ring 10 can be mounted radially. This is of advantage especially in the case of divided turbomachines.

In addition, the guide vane ring 10 comprises an outer shroud 14 arranged radially on the outer side of the guide vanes 12 and an inner shroud 16 arranged radially on the inner side of the guide vanes 12. In the example shown in FIG. 1, the guide vane ring 10 is mounted, for example, by means of the outer shroud 14 on the turbomachine. The inner shroud 16 has a plurality of expansion joints 18 spaced apart from one another along the peripheral direction. In this case, the peripheral direction is marked by arrow 20. By means of the expansion joints 18, any expansion of the guide vane ring 10 and in particular of the inner shroud 16 can be compensated for. Such an expansion can be caused, for example, by a thermal load during operation of the turbomachine.

The guide vane ring 10 with the guide vane 12, the outer shroud 14, and the inner shroud 16 is manufactured in one piece by means of an additive manufacturing method. Such a guide vane ring 10, which can also be referred to as a guide vane cascade, is also referred to as an integral guide vane ring 10. Particularly in the case of especially large turbomachines and/or turbomachines with especially high temperatures, the expansion joints 18 are required in order for the guide vane ring 10 to be able to withstand the loads during operation of the turbomachine. Otherwise, in the case of especially large turbomachines, such as, for example, aircraft engines, cracks on the guide vane ring 10 can occur in the absence of expansion joints 18. However, owing to the expansion joints 18, a flow of gas flowing around the guide vanes 12 can at least partially escape. Such a leakage leads to a reduced efficiency of the turbomachine. The efficiency of the turbomachine can therefore decrease on account of the expansion joints 18.

Figure 2:
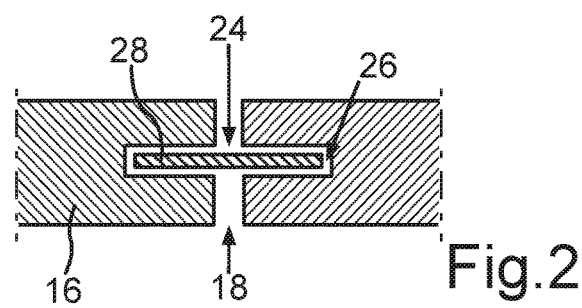
FIG. 2 is an excerpted schematic sectional view of an inner shroud of the guide vane ring according to FIG. 1 with an expansion joint and a first embodiment of a sealing device.

For this reason, each expansion joint 18 is sealed by at least one sealing device 24 arranged in the respective expansion joint 18. A first exemplary embodiment of such a sealing device 24 is shown, for example, in the excerpted schematic sectional view of the guide vane ring 10 in FIG. 2. Here, the sealing device 24 comprises in each case a sealing element 28 mounted loosely in a receiving region 26 of the respective expansion joint 18. The sealing element 28 in this case is designed, for example, as a plate. Provided between the sealing element 28 and the sides of the inner shroud 16, which delimit the expansion joint 18, are joints in the receiving space 26, which are able to compensate for a different expansion of the sealing element 28 and the inner shroud 16. The sealing element 28 is pressed, for example, by different gas pressures in such a way against the upper or lower edge of the receiving space 26 that the expansion joint 18 is sealed at least partially or even completely. A sealing device 24 designed according to the first exemplary embodiment is especially robust.

Figure 3:
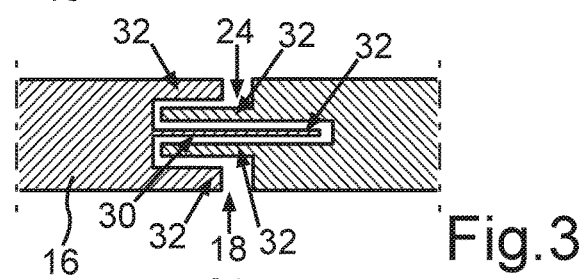
FIG. 3 is a schematic sectional view of a second embodiment of the sealing device.

FIG. 3 shows an excerpted sectional view of a second embodiment of the sealing device 24. In FIG. 3, the sealing device 24 is designed as a labyrinth seal 30 in one piece with the inner shroud 16 having the expansion joints 18. In this case, the labyrinth seal 30 is formed by respective pin-shaped end regions 32 of the sides of the inner shroud 16 that delimit the expansion joint 18. The sealing device 24 according to the second embodiment is especially robust and is able to seal the turbomachine or the expansion joint 18 especially well. In addition, this sealing device 24 has no moving parts.

Figure 4:
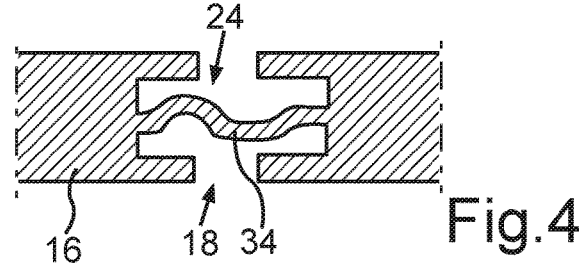
FIG. 4 is a schematic sectional view of a third embodiment of the sealing device.

FIG. 4 shows another excerpted sectional view of the guide vane ring 10 by way of a third embodiment of the sealing device 24 as example. In this case, the sealing device 24 comprises an elastically and/or plastically deformable sealing element 34, which is designed as a spring-like and meandering element. In this case, the sealing element 34 is also formed in one piece with the inner shroud 16 having the expansion joints 18. The sealing element 34 in this case is formed directly subsequently on the sides of the inner shroud 16 that delimit the expansion joint 18. In particular, it is thereby possible for the sealing element 34 to seal completely the expansion joint 18. Owing to its spring-like and meandering design, the sealing element 34 can compensate for any expansion of the inner shroud 16 especially well. The sealing element 34 can then deform in a corresponding way, without any ensuing losses in its sealing effect or any damage to the sealing device 24 or the guide vane ring 10.

Alternatively to the expansion joints 18 in the inner shroud 16, the expansion joints 18 can also be provided in the outer shroud 14 (not illustrated). This can be especially advantageous when the guide vane ring 10 is to be mounted on its inner shroud 16 on the turbomachine. Moreover, this can be especially advantageous when the highest thermal load of the guide vane ring 10 acts on the outer shroud 14 and not on the inner shroud 16.

Preferably, all components of the guide vane ring 10, in particular the guide vanes 12, the outer shroud 14, the inner shroud 16, and the sealing device 24 are formed from the same material, such as, for example, a nickel-based alloy. In this case, the additive manufacturing method for the manufacture of the guide vane ring 10 is especially cost-effective and simple. Moreover, all components of the guide vane ring 10 are then joined to one another especially well and exhibit homogeneous material properties, particularly under thermal load. Alternatively, individual parts and/or partial regions of the guide vane ring 10 can also be composed of different materials. The guide vane ring 10 can then be constructed especially well relative to loads.

Owing to the fact that the guide vane ring 10 is manufactured by means of an additive manufacturing method, such as, for example, selective laser melting or laser sintering, it is possible to design the sealing device 24 and/or the sealing elements 28, 34 thereof in such a way that is not possible using other methods of manufacture. In particular, it is thereby possible to create a sealing device 24 that seals the expansion joints 18 especially well or even completely. Moreover, the guide vane ring 10 can be manufactured in an especially cost-effective manner in this way, because no further fabrication steps and/or assembly steps are necessary for the sealing device 24. In addition, a one-piece guide vane ring 10 is also especially robust.

What is claimed is:

1. A guide vane ring for a turbomachine with at least one guide vane ring segment comprising at least one guide vane arranged radially around an axis of rotation, an outer shroud arranged radially on the outer side of the guide vane, and an inner shroud arranged radially on the inner side of the guide vane, with the outer shroud or the inner shroud having at least one expansion joint, wherein the guide vane ring segment with the guide vane, the outer shroud, and the inner shroud is formed in one piece and the at least one expansion joint is sealed by at least one sealing device arranged in the expansion joint, wherein the sealing device has an elastically and/or plastically deformable sealing element, which is configured in one piece with the outer shroud or inner shroud having the expansion joints.

2. The guide vane ring according to claim 1, wherein the guide vane ring segment is manufactured by an additive manufacturing method.

3. The guide vane ring according to one of claim 1, wherein the guide vane ring is composed of a single guide vane ring segment that runs 360° around the axis of rotation.

4. The guide vane ring according to claim 1, wherein the sealing device is manufactured in one piece with the outer shroud or the inner shroud.

5. The guide vane ring according to claim 1, wherein the inner shroud or the outer shroud has the expansion joints.

6. The guide vane ring according to claim 1, wherein the sealing device and the outer shroud and/or the inner shroud are formed from the same material.

7. The guide vane ring according to claim 1, wherein the elastically and/or plastically deformable sealing element is configured as a spring-like, corrugated, S-shaped and/or meandering element.

8. The guide vane ring according to claim 1, wherein, in the region of the mutually adjacent sides of the outer shroud and/or inner shroud of at least two guide vane ring segments, an expansion joint is located, in which at least one sealing element is arranged.

9. The guide vane ring according to claim 8, wherein the expansion joint is located entirely in one of the mutually adjacent lateral regions of the outer shroud and/or inner shroud or the expansion joint is located in portions by respectively mutually adjacent recesses in the mutually adjacent lateral regions of the outer shroud and/or inner shroud.

10. The guide vane ring (10) according to claim 1, wherein the at least one guide vane ring is in a gas turbine.

11. A method for the additive manufacture of a guide vane ring for a turbomachine with at least one guide vane ring segment comprising at least one guide vane arranged radially around an axis of rotation, an outer shroud arranged radially on the outer side of the guide vane, and an inner shroud arranged radially on the inner side of the guide vane, with the outer shroud or the inner shroud having at least one expansion joint, comprising at least the following steps:

local melting of a powder layer or a liquid layer by a high-energy beam that is produced by a radiation source and diverted by a diverting device for local fusion and/or sintering of the powder layer or the liquid layer to form a first component layer;

deposition and local melting of further powder layers or liquid layers on the first component layer for local generation of further component layers on the first component layer;

repetition of the deposition and local melting of the powder layer or liquid layer for the one-piece manufacture of the guide vanes, the outer shroud, the inner shroud, and, in each case, at least one sealing device arranged in the at least one expansion joint, by which this expansion joint is sealed, wherein no additional fabricating steps are required for manufacturing the at least one expansion joint.

12. The method according to claim 11, wherein the sealing device comprises a sealing element that is mounted loosely in a receiving region of the expansion joint.

13. The method according to claim 11, wherein the sealing device is designed as a labyrinth seal in one piece with the outer shroud or inner shroud having the expansion joints.

14. The method according to claim 11, wherein the method is an additive manufacturing method, selected from the group consisting of selective laser melting and laser sintering.

15. The method according to claim 11, wherein the sealing device has an elastically and/or plastically deformable sealing element, which is configured in one piece with the outer shroud or inner shroud having the expansion joints.

16. The method according to claim 15, wherein the elastically and/or plastically deformable sealing element is configured as a spring-like, corrugated, S-shaped and/or meandering element.

* * * * *